United States Patent [19]

Sieber et al.

[11] Patent Number: 5,349,331
[45] Date of Patent: Sep. 20, 1994

[54] SECURING DEVICE FOR PREVENTING AN ATTEMPTED THEFT AND UNLOCKING DEVICE

[75] Inventors: Heinrich Sieber, Marbach; Roland Wolf, Schonenberg Ander. Thur., both of Switzerland

[73] Assignee: Veronica Murray, Flagler Beach, Fla.

[21] Appl. No.: 941,261

[22] Filed: Sep. 4, 1992

[51] Int. Cl.⁵ .................. A47G 29/00; B65D 50/14; G08B 13/00
[52] U.S. Cl. .................... 340/572; 206/309; 206/807; 211/40; 211/41; 340/551; 340/693
[58] Field of Search .............. 340/572, 551, 693; 206/309, 307, 311, 807, 387, 1.5; 211/40, 41

[56] References Cited

U.S. PATENT DOCUMENTS

| | | | |
|---|---|---|---|
| 4,074,249 | 2/1978 | Minasy | 340/572 |
| 4,075,618 | 2/1978 | Montean | 340/572 |
| 4,483,049 | 11/1984 | Gustavsson et al. | 70/57.1 |
| 4,538,730 | 9/1985 | Wu | 206/309 |
| 4,649,397 | 3/1987 | Heaton et al. | 343/895 |
| 4,805,769 | 2/1989 | Soltis et al. | 206/807 |
| 5,027,955 | 7/1991 | Shoemaker, Jr. et al. | 206/309 |
| 5,048,680 | 9/1991 | Fitzpatrick | 206/309 |
| 5,081,446 | 1/1992 | Gill et al. | 340/572 |
| 5,160,050 | 11/1992 | Russo | 211/40 |

FOREIGN PATENT DOCUMENTS 405155   1/1991   European Pat. Off. .
9074CH  12/1991   Switzerland .

*Primary Examiner*—Glen Swann
*Attorney, Agent, or Firm*—Oblon, Spivak, McClelland, Maier & Neustadt

[57] ABSTRACT

A holder (10) exhibits a frame-like housing (11) having a base (12) for receiving a CD case (14). This case is inserted in the arrow directions (15, 16, 17). A closing element (13) is then pressed down in the arrow direction (18), whereupon it snaps in place. The CD case (14) is held by retaining wall parts (24, 25) disposed on the otherwise open housing-topside. For opening, a device having a vacuum source has to be attached to a connecting socket (28) in order for the closing element (13) to be re-released. The holder (10) is equipped with a signalling means, which, upon the passage of a contactless-working electronic barrier, triggers a signal if the holder containing the CD case were to be stolen.

50 Claims, 4 Drawing Sheets

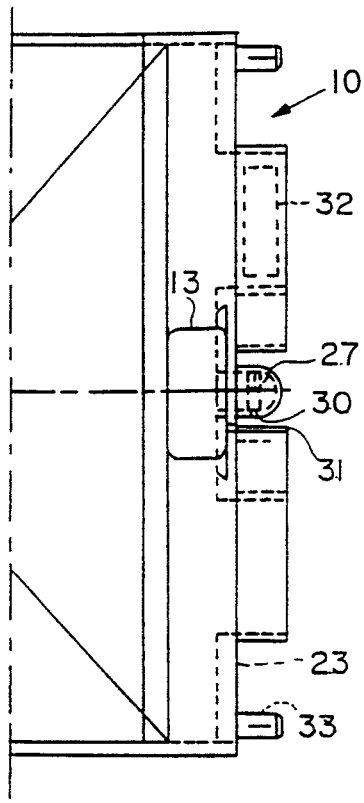
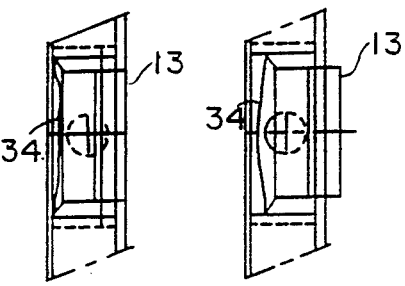
FIG. 5  FIG. 6  FIG. 7
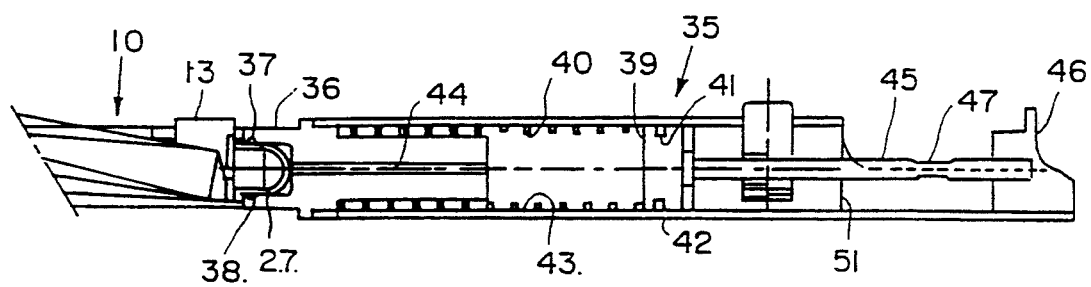
FIG. 8
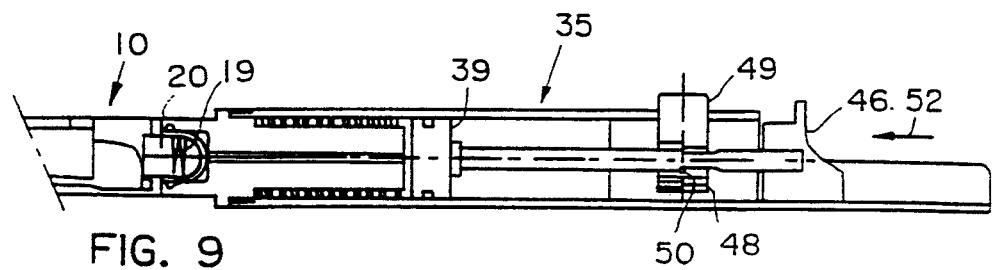
FIG. 9

SECURING DEVICE FOR PREVENTING AN ATTEMPTED THEFT AND UNLOCKING DEVICE

BACKGROUND OF THE INVENTION

1. Field of the Invention

The invention relates to a securing device which is designed to prevent an attempted theft and is connectable to an article to be secured; it also relates to an unlocking device for unlocking the securing device and to devices for holding or mounting such securing devices.

The securing device is designed, in particular, to secure a compact disc stored in a case, hereinafter referred to as a CD.

2. Discussion of the Background

Securing devices are known which trigger an acoustic signal whenever the article secured therewith is carried through a contactless-working barrier, for example on leaving sales premises. A barrier of this kind can exhibit, for example, an induction loop having an oscillatory circuit and the device can exhibit an inductance which gives rise to a resonance. Means of this type for triggering a signal do not however form the subject of the present invention and are assumed to be known, so they are not described in greater detail here.

A securing device known from EP-A1-0 405 155 can be opened on a mechanical or on a magnetic basis. Although special devices are designed for opening purposes, it cannot be ruled out that securing devices of this type might also be opened without any such special devices, using other means, e.g. magnets or other tools, and the therewith secured goods stolen.

SUMMARY OF THE INVENTION

The object of the invention is therefore to provide a device for securing an article, in particular a CD stored in a case, and an interacting unlocking device which makes it considerably more difficult or even impossible to effect opening using means not designed for this purpose. In addition, CD cases of this kind are intended to be convenient and easy to use, in order to aid their sale.

In accordance with the present invention, a pressure or vacuum source. A source is advantageously utilized of this kind is far more difficult to carry along than means for the mechanical or magnetic opening of the locking device. Moreover, the locking device can be shaped such that it is not possible to tell directly from it by which means it can be opened.

A particularly preferred embodiment requires a vacuum source to open the locking device, with the vacuum source preferably difficult to readily obtain since it is different than that of an ordinary pressure source, e.g. a bicycle pump. Consequently, an embodiment of this kind guarantees even better protection from unauthorised opening.

BRIEF DESCRIPTION OF THE DRAWINGS

With reference to the drawings, illustrative embodiments of the invention are explained in greater detail in relation to the securing of a CD.

FIG. 5 shows a partial view of the holder exhibiting a locking device according to FIG. 1, FIG. 6 shows a front view of the locking device according to FIG. 5 in the locking position, FIG. 7 shows a front view of the locking device according to FIG. 5 in the release position, FIG. 8 shows an unlocking device, designed to undo the locking device, in the untensioned position, exhibiting the locking device in the release position, FIG. 9 shows the unlocking device according to FIG. 8 in the tensioned position, exhibiting the locking device in the locking position.

DESCRIPTION OF THE PREFERRED EMBODIMENTS

Figure 1:
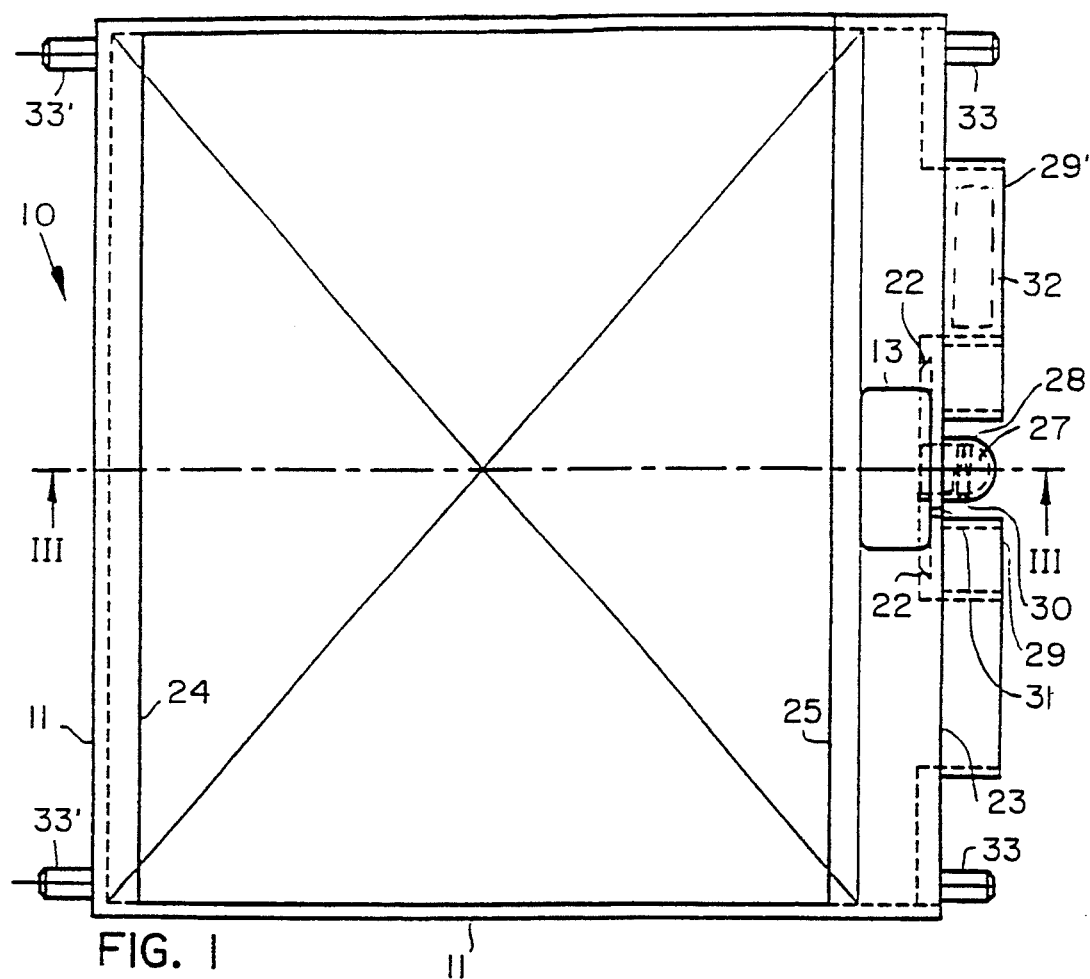
FIG. 1 shows a holder, configured as a securing device, exhibiting a locking device for a CD case, in top view.
Figure 2:
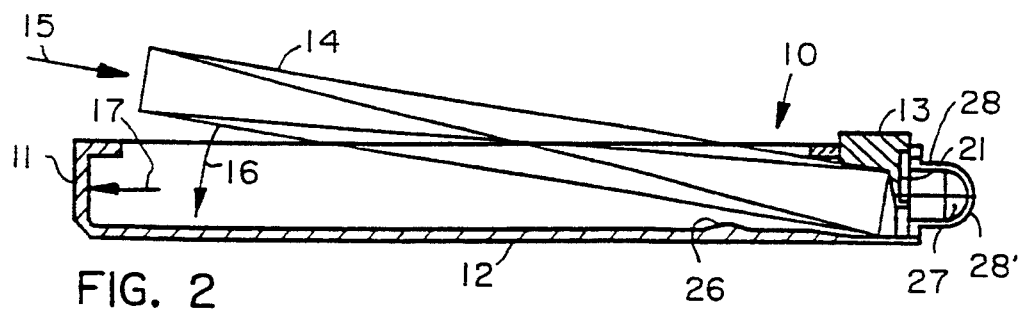
FIG. 2 shows the holder according to FIG. 1 in a sectional view in the release position, as a CD case is being inserted.
Figure 3:
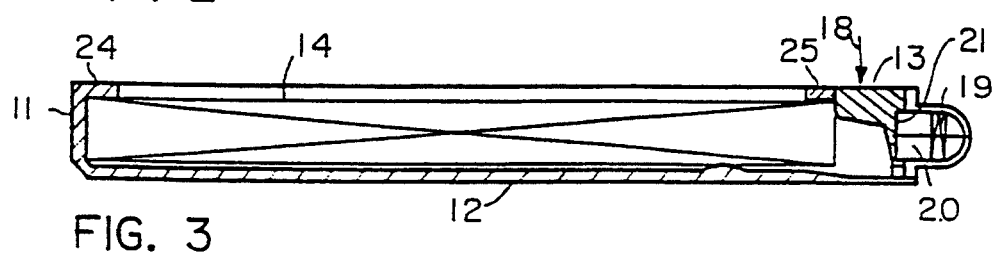
FIG. 3 shows the holder according to FIG. 1, in the section III—III, exhibiting an inserted CD case, in the locking position

The holder 10, represented in FIGS. 1 to 4 as a securing device, exhibits a frame-like housing 11 and a closing element 13 which is displaceable therein at right-angles to the base 12 of the housing 11. In FIG. 2 the closing element 13 is represented in its release position and in FIG. 3 in its locking position.

The frame-like housing 11 is dimensioned for receiving a CD case 14. This is inserted according to FIG. 2, in the release position of the closing element 13, according to arrow directions 15, 16, 17. By being pressed down in the arrow direction 18 according to FIG. 3, the closing element 13 is then moved into its locking position, in which it is held by the snapping-in of a piston 20 under the force of a spring 19. The piston 20 serving as a locking element thereupon engages into a recess 21 disposed in the closing element 13. According to FIG. 1, the closing element 13 is guided displaceably, by means of dovetail guides 22, on the front side 23 of the housing 11.

In order to hold the CD case 14 in the locking position, the housing part or frame part 11 exhibits, on the essentially open side opposite the base 12, retaining wall parts 24, 25, fixed to the housing and disposed at two opposite-facing edges, one of which 25 is connected to the front side 23. In the locking position, the closing element 13 prevents any displacement of the inserted CD case 14 in the direction of the front side 23 of the housing 11, so that it is not possible for the CD case 14 lying under the retaining wall parts 24, 25 to be removed from the housing 11.

The base 12 of the housing 11 consists preferably of a transparent material to enable the inscription in the CD case to be read. Between its centre and the front side 23, it exhibits an inwardly directed arch 26 to aid the removal of the CD case 14 in the release position according to FIG. 2, by the front-sided end of the CD-case being pressed against the base 12.

The piston 20 is open at one end and hollow, so that the spring 19, configured as a helical spring, finds room therein, in particular in its tensioned position with the piston 20 retracted, in the release position according to FIG. 2. The piston 20 is displaceable in a piston chamber 27, which is disposed in a connecting socket 28 projecting out of the front side 23. The connecting socket 28 exhibits a concave end 28', within which the spring 19 is supported on the housing side.

According to FIG. 1, the housing 11 exhibits, on its front side 23, two foot parts 29, 29', between which the connecting socket 28 is disposed.

In the connecting socket 28, there is disposed a radially outwardly directed bore 30 leading into the piston chamber 27. Accordingly, this bore 30 extends at least approximately at right-angles to the longitudinal axis of the connecting socket 28 and hence in the direction of the one foot part 29.

The bore 30 serves to retract the piston 20, by means of a vacuum, counter to the force of the spring 19, in order to release the closing element 13. As a result of the arrangement of the bore 30 in the direction of the foot part 29, it is made difficult, in particular, for the piston 20 to be retracted by actuating it by mouth. Any such intention is rendered impossible, moreover, by the fact that the space between the connecting socket 28 and the foot part 29 is connected via a second bore 31 to the interior of the housing 11, which is open in air-technology terms, since the attainment of a vacuum is thereby virtually precluded.

The housing 11 preferably exhibits signalling means 32 disposed in the foot part 29', which, upon the passage of a contactless-working barrier (not represented), trigger a signal to indicate an attempted theft. These signalling means 32 can contain, for example, a magnetic platelet, an inductance or electronic elements.

Figure 4:
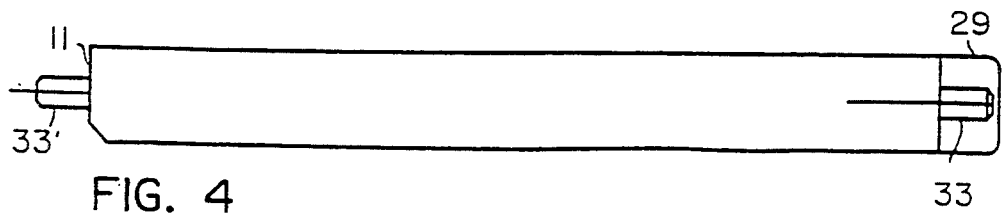
FIG. 4 shows a side view of the holder.

FIGS. 1 and 4 show pins 33, 33' disposed on the housing 11, of which two pins 33 are located on the front side 23 and two pins 33' on the opposite side.

From FIGS. 5, 6 and 7, the displaceable arrangement of the closing element 13 can be particularly clearly seen, which closing element is pre-tensioned in the direction of the release position by a leaf spring 34. In FIG. 6, the closing element 13 is snapped in place in the locking position and in FIG. 7 it is located in the release position.

In FIGS. 8 and 9, an unlocking device 35 is in each case attached to the connecting socket 28 of the holder 10. The unlocking device 35 serves to generate a vacuum and hence to retract the piston 20 against the force of the spring 19.

The unlocking device 35 exhibits a mouthpiece 36 which, in FIGS. 8 and 9, is pushed over the connecting socket 28. Within the mouthpiece 36 is disposed an annular groove 37, in which there is inserted an O-ring 38 sealing the mouthpiece 36 against the connecting socket 28.

A piston 39 in the unlocking device 35 is prestressed, by means of a helical spring 40, into its rest position represented in FIG. 8. On the periphery, the piston 39 is provided with an annular groove 41, in which an O-ring 42 is inserted as a piston ring. The piston 39 is displaceably guided in a cylinder 43, the cylinder chamber of which is connected via a duct 44 to the mouthpiece 36.

A piston rod 45, connected to the piston 39, exhibits at its end opposite to the piston 39 a grip 46. A notch 47 in the piston rod 45 serves to detain the latter in the tensioned position shown in FIG. 9. In this connection, a trip element 49 under pressure from a helical spring 48 engages by a lug 50 into the notch 47, in order to hold the piston rod 45 together with the piston 39 in the tensioned position. The piston 39 and the trip element 49 are displaceably mounted, respectively, in a block 51 fastened in the cylinder 43.

In order to unlock the locking device which is connected to the holder 10 and exhibits the component parts 13, 19, 20, the unlocking device 35 is tensioned by actuation of the grip 46 in the arrow direction 52 and is pushed by the mouthpiece 36 onto the connecting socket 28 on the holder 10. By subsequently pressing down the pushbutton-like trip element 49, the piston rod 45 is released, so that the piston 39 springs back under the force of the spring 40. The vacuum which is thereby created is transmitted through the bore 30 (FIG. 5) in the connecting socket 28 to the piston chamber 27. The piston 20 of the locking device is retracted, by virtue of the vacuum, against the force of its spring 19. This releases the closing element 13, which is moved by its leaf spring 34 into the release position according to FIG. 7. The CD case 14 can now be removed, counter to the arrow directions 15, 16, 17 according to FIG. 2, from the holder 10.

As a result of the present invention, the unnoticed theft of an article secured according to the above description, in particular a CD, is rendered considerably more difficult. The fact that a vacuum source is necessary to unlock or open the locking device is not however directly recognisable from the holder. However, even if this recognition is made, a suitable vacuum source will still generally be lacking, since not only is it necessary to generate a vacuum, but a correct-fitting connecting piece, such as, for example, the mouthpiece 36, is also required. If no such connecting piece is at hand, then it is barely possible to transmit a vacuum into the piston chamber 27.

As a result of the position of the bore 30, through which the vacuum is transmitted by means of the unlocking device 35, and as a result of the arrangement of the bore 31, which lets through secondary air when any attempt is made to actuate it by mouth, the securing device according to the invention is an effective protection against theft.

Figures 10, 11:
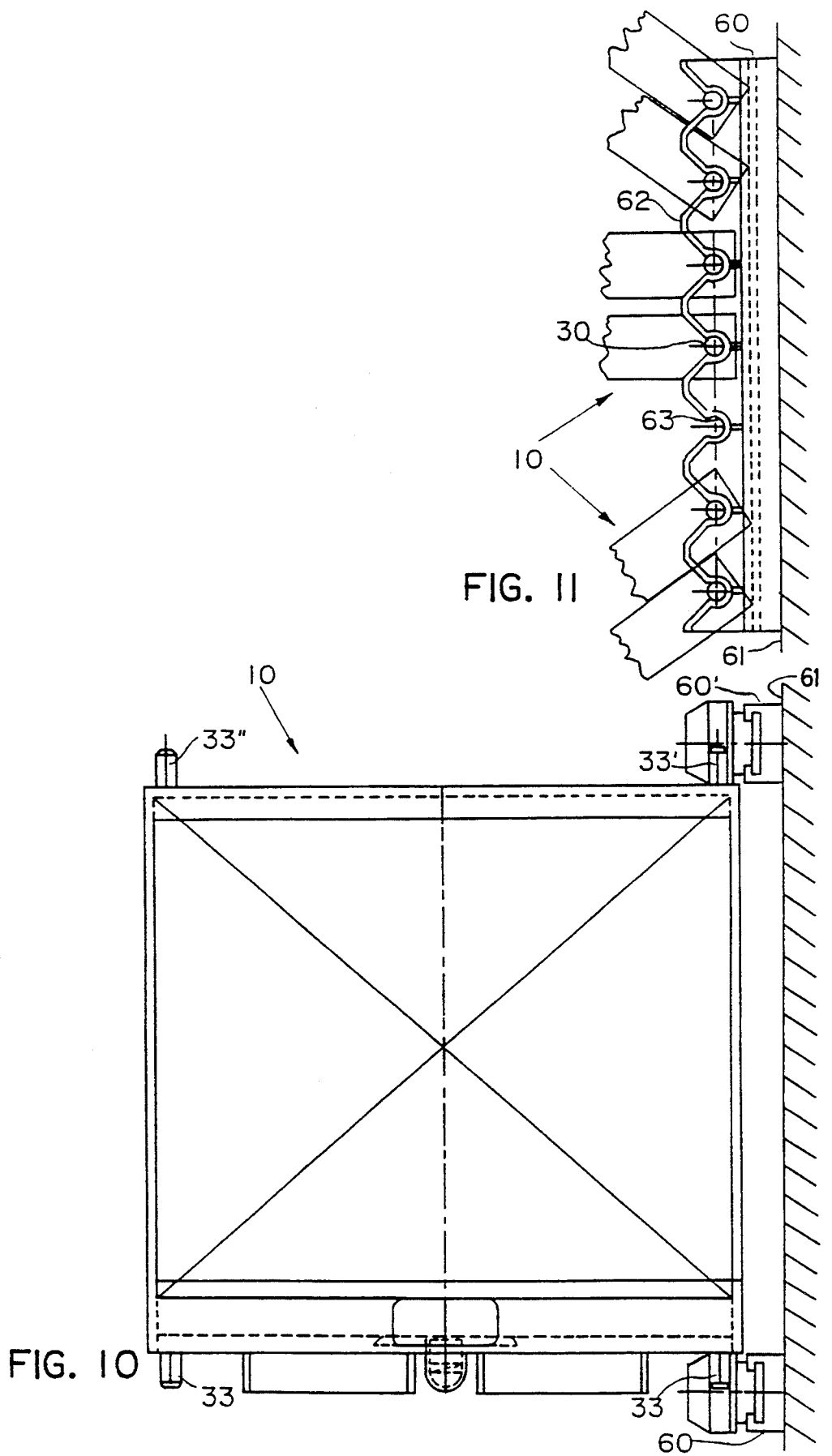
FIG. 10 shows the holder according to FIG. 1 pivotably mounted between two holding rails.
FIG. 11 shows a top view of a holding rail according to FIG. 10

In FIG. 10, a securing device or holder 10 is pivotably mounted having its pins 33, 33' between two holding rails 60, 60'. These holding rails 60, 60' are suitable for fastening to a vertical surface 61, for example a wall.

FIG. 11 shows a top view of the upper holding rail 60, in which a plurality of holders 10 with CD cases located therein are pivotably fastened for leafing through. From FIG. 11, it can also be seen that the holding rail 60 exhibits a band 62 having notches 63 into which the holders 10 can be pressed by their pins 33, 33' in the radial direction for snapping in place. Conversely, the holders 10 can also be snapped out again by their pins 33, 33'. The holders 10 can be leafed through by means of the outer pins 33'', 33.

The moulded bands 62 consists of a spring-elastic material, preferably a plastic. They are connected by means of bars to a base rail.

Figure 12:
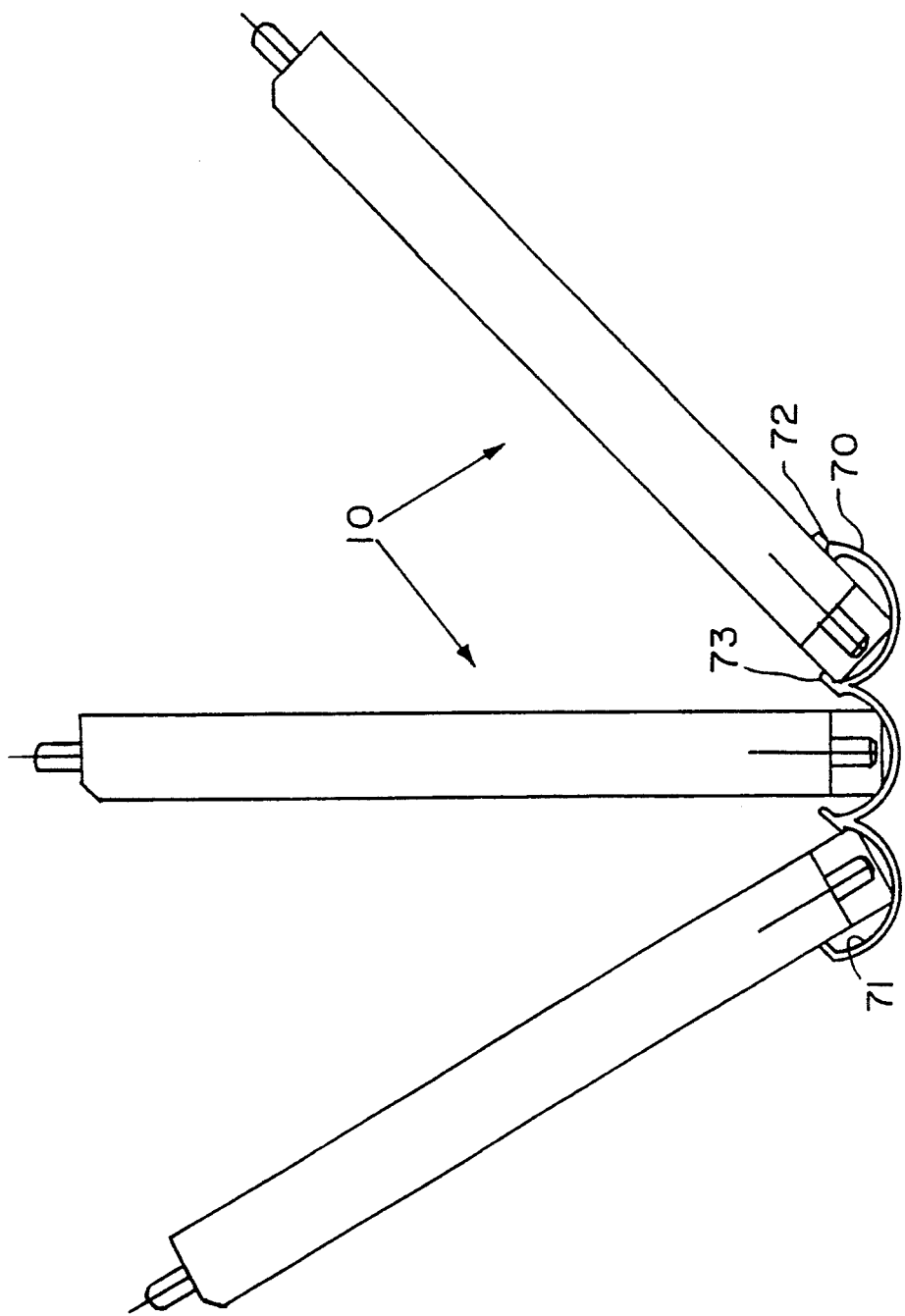
FIG. 12 shows a front view of a stand device exhibiting holders inserted therein.

FIG. 12 shows a section of a stand device 70 designed for the mounting of holders 10. This exhibits adjacent-running, extended, trough-like recesses 71, matched to the holders 10 and having limit stops 72, 73. These are formed such that the holders 10 therein can be tilted in both directions up to a pre-determined angle without overturning, thereby ensuring that the holders 10 can be leafed through like cards.

The holding rails 60, 60' according to FIGS. 10 and 11, and the stand device 70 according to FIG. 12, enable the securing devices configured as holders 10 to be mounted in the same way as CD cases without such holders. This ensures that the compact discs stored in the holders 10 can be presented without any restriction.

Although, in the above description of a preferred illustrative embodiment, the unlocking of the locking device has been described solely by means of a vacuum, it is equally possible to use pressure for the unlocking. In this case, the piston 20 would have to be pressurised from its other side and the unlocking device 35 would have to be configured as a pressure source.

In the illustrative embodiment, the piston 20 is moved by a pressure differential which overcomes the force of a spring 19, to release the CD, with the spring 19 serving for the return motion of the piston 20. The return motion can also however be effected by means of a magnet (not represented).

We claim:

1. Securing device designed to prevent an attempted theft, having a locking device including a closing element which is movable relative to a basic part and a catch element holding the closing element in a locking position, which catch element can be unlocked by a separate unlocking device, wherein the basic part is a housing part or frame part for receiving an article to be secured, and wherein the closing element is configured such that it retains the article in the locking position in the housing part or frame part and further wherein the catch element functioning as a latch-type or snap-in catch interacts with a pressure responsive element serving to move the said catch element from the locking position into a release position or is itself configured as such an element.

2. Securing device according to claim 1, wherein the pressure responsive element is a piston, which can be moved by means of a vacuum, against the force of a first spring or of a magnet, out of the locking position into the release position.

3. Securing device according to claim 2, wherein the piston is displaceably mounted in a piston chamber, which includes a connecting socket having a bore which is placed in communication with the unlocking device.

4. Securing device according to claim 3, wherein the connecting socket projects out of the basic part and includes a convex end for the attachment of a mouthpiece of the unlocking device.

5. Securing device according to claim 3, wherein the said bore extends at least approximately at right-angles to the axial direction of the connecting socket within the latter.

6. Securing device according to claim 5, wherein the bore at least partially extends in a direction toward a foot part disposed next to the connecting socket on the basic part.

7. Securing device according to claim 6, wherein a second bore connects the interspace between the connecting socket and the foot part to the ambient atmosphere on the other side of the basic part.

8. The securing device of claim 3, further including an unlocking device for unlocking the locking device of the securing device, wherein said unlocking device includes one of a pressure and a vacuum source, and an adapter for connection to the connecting socket of the locking device.

9. The securing device according to claim 8, wherein the one of a pressure and vacuum source includes a manually actuable piston-cylinder-arrangement.

10. The securing device of claim 9, wherein the unlocking device piston is pre-tensioned in a first position by a spring and is connected via a piston rod to a grip.

11. The securing device according to claim 10, wherein the unlocking device piston can be retained in said first position by means of a retaining device and is configured, for actuation purposes, such that it can be released promptly.

12. The securing device according to claim 11, wherein upon release of said retaining device the unlocking device piston moves in a cylinder of said piston-cylinder-arrangement by said spring which pre-tensions said unlocking device piston in said first position such that said spring moves said unlocking device piston from said first position resulting in a reduced pressure in a portion of said cylinder.

13. The securing device according to claim 8, wherein the adapter includes a hollow mouthpiece, matched to the connecting socket of the securing device and having an O-ring seal inserted therein.

14. Securing device according to claim 1, further including signalling means for triggering a signal upon passage by a detector.

15. Securing device according to claim 14, wherein the housing part or frame part includes a transparent base and, on the side opposite the base, at two opposite-facing edges, retaining wall parts.

16. Securing device according to claim 15, wherein the closing element is displaceable at right-angles to the base and is formed such that, in the release position, it enables an article of pre-determined size to be inserted behind the retaining wall parts and, in the locking position, prevents removal.

17. Securing device according to claim 1, wherein the closing element is displaceably mounted in the housing part or frame part and is pre-tensioned by means of a second spring in the direction of the release position.

18. The securing device according to claim 1, wherein said housing is sized to receive a compact disc case.

19. The securing device of claim 1, further including holding rails for holding a series of securing devices, wherein the holding rails, which are suitable for wall-fastening, include adjacent-running, spring-elastic notches, disposed transversely to their longitudinal extent, for receiving a series of securing devices by holding pins which are connected to said securing devices.

20. The securing device of claim 19, wherein the holding rails are designed for arrangement next to one another in pairs, at a spacing matched to the securing devices.

21. Holding rails for holding a series of securing devices, wherein the holding rails, which are suitable for wall-fastening, include adjacent-running, spring-elastic notches, with the spring-elastic notches disposed transversely with respect to a longitudinal extent of the holding rails, for receiving a series of securing devices by grasping pins connected to said securing devices, such that said pins are held in said spring-elastic notches.

22. A securing device for preventing theft of an article held by said securing device comprising:
 a housing for holding an article;
 a closing element movable relative to said housing between a locking position and a release position;
 a latch element which engages said closing element when said closing element is in said locking position;

a piston chamber connected to said latch element, said piston chamber including an aperture; and a differential pressure source for changing a pressure in said piston chamber through sid aperture and thereby cause movement of said latch member.

23. The securing device of claim 22, further including:

a first spring biasing said closing element toward said release position; and wherein said latch element is movable between a first position at which said latch element engages said closing element in said locking position, and a second position at which said latch element does not engage said closing element such that said closing element is allowed to move to said release position, the securing device further including a second spring biasing said latch element toward said first position.

24. The securing device of claim 22, further including a holding device for holding said housing.

25. The securing device of claim 24, wherein said holding device includes a plurality of holders for holding a plurality of said housings.

26. The securing device of claim 24, further including at least one pin connected to said housing, and wherein said holding devices holds said pin such that said housing is pivotally mounted upon said holding device.

27. The securing device of claim 22, wherein said housing is in the form of a tray which holds a compact disc case therein.

28. The securing device of claim 27, wherein said housing includes a first and second wall parts and a base, and wherein said closing element is spaced from said base in said release position by an amount greater than a spacing between said closing element and said base in said locking position, whereby a compact disc case can be inserted between said first and second wall parts when said closing element is in the release position.

29. The securing device of claim 22, wherein said differential pressure source includes a manually actuable piston cylinder assembly.

30. The securing device of claim 22, wherein at least a portion of said piston chamber protrudes from said housing and includes said aperture therein; and wherein said differential pressure source includes a recessed portion at one end thereof such that said recessed portion receives a protruding part of said piston chamber, and further wherein said differential pressure source includes a duct connected to said recessed portion for supplying the differential pressure to said recessed portion.

31. The securing device of claim 30, further including at least one member extending from said housing at a location adjacent but spaced from the protruding part of said piston chamber, thereby preventing access to said aperture of said piston chamber by an unauthorized differential pressure source.

32. A securing device for preventing theft of an article held by said securing device comprising:

a housing for holding an article;

a closing element movable relative to said housing between a locking position and a release position;

a latch element which engages said closing element when said closing element is in said locking position;

a first spring biasing said closing element toward said release portion;

wherein said latch element is movable between a first position at which said latch element engages said closing element in said locking position, and a second position at which said latch element does not engage said closing element such that said closing element is allowed to move to said release position, the securing device further including a second spring biasing said latch element toward said first position; and wherein said latch element is connected to a piston chamber having an aperture therein for connection to a vaccum source, such that upon application of a vacuum to said piston camber, said latch element is moved from said first position to said second position to thereby release said closing element.

33. The securing device of claim 32, wherein said latch element is in the form of a piston, and wherein said closing element includes a recessed portion which receives said piston when said closing element is in the locking position.

34. A securing device comprising:

a housing for holding an article;

a latch element movable between first and second positions, wherein said article is locked in said housing in said first position and removable from said housing in said second position;

a piston chamber connected to said latch element, wherein said latch element is movable relative to said piston chamber upon application of a differential pressure to said piston chamber such that a pressure in said piston chamber is different from ambient pressure; and a differential pressure source for supplying a differential pressure to said piston chamber.

35. The securing device of claim 34, wherein said piston chamber includes a protruding part having an aperture therein, and said differential pressure source includes a recess which receives said protruding part and thereby places said piston chamber in communication with said differential pressure source.

36. The securing device of claim 35, further including a member extending from said housing adjacent but spaced from said protruding part, thereby preventing access to said protruding part by an unauthorized differential pressure source.

37. The securing device of claim 34, wherein said differential pressure source includes means for supplying a vacuum pressure.

38. The securing device of claim 37, further including a spring biasing said latch element toward said first position, and wherein application of said vacuum pressure moves said latch element to said second position in opposition to said spring.

39. The securing device of claim 34, further including a closing element having a recess which receives said latch element when said latch element is in said first position.

40. The securing device of claim 34, further including a rack for holding a plurality of said housings.

41. The securing device of claim 40, wherein said rack includes means for pivotably holding said plurality of housings.

42. The securing device of claim 34, wherein said housing includes a rectangular cross-section sized to receive a compact disc case.

43. The securing device of claim 34, wherein said differential pressure source includes a manually operable piston cylinder assembly.

44. The securing device of claim 34, further including a signalling device associated with said housing for triggering a signal upon passage by a detector.

45. The securing device of claim 34, further including at least one pin extending from said housing; and
   a rack for holding said pin such that said housing is pivotable with respect to said rack.

46. An unlocking device for unlocking a securing device comprising:
   a mouthpiece for connecting said unlocking device to a securing device;
   a chamber;
   a piston mounted within said chamber and movable within said chamber to thereby create a pressure differential within said chamber;
   a duct separate from said piston, said duct including a passage connecting said mouthpiece with said chamber such that said pressure differential is transmitted to said mouthpiece.

47. The unlocking device of claim 46, wherein said mouthpiece includes a recessed portion for receiving a protrusion of a securing device, and wherein an o-ring seal is disposed within said recessed portion.

48. The unlocking device of claim 46, further including an actuator connected to said piston and extending from said piston to an exterior of said chamber, said actuator allowing movement of said piston between first and second positions, wherein in said first position said piston is adjacent said duct and in said second position said piston is spaced from said duct, wherein movement of said piston from said first position to said second position creates a vacuum pressure within said chamber which is transmitted by said duct to said mouthpiece, the unlocking device further including biasing means biasing said piston toward said second position.

49. The unlocking device of claim 48, further including a trip element which holds said piston in said first position in opposition to said biasing means such that when said trip element is released said biasing means causes said piston to move from said first position to said second position thereby creating a vacuum pressure in said chamber.

50. The unlocking device of claim 48, wherein said biasing means includes a spring which at least partially extends about said duct.

* * * * *